US010201176B2

(12) United States Patent
Herrera-Gomez et al.

(10) Patent No.: US 10,201,176 B2
(45) Date of Patent: Feb. 12, 2019

(54) OXIDIZED FLAVOR NOTE SUPPRESSION IN COMESTIBLES

(71) Applicant: Kraft Foods Group Brands LLC, Northfield, IL (US)

(72) Inventors: Orlando Herrera-Gomez, Evanston, IL (US); Lisa Ann Dierbach, Arlington Heights, IL (US); John B. Topinka, Evanston, IL (US); Deborah D. Barber, Hoffman Estates, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 290 days.

(21) Appl. No.: 13/791,096

(22) Filed: Mar. 8, 2013

(65) Prior Publication Data

US 2013/0236620 A1    Sep. 12, 2013

Related U.S. Application Data

(60) Provisional application No. 61/609,044, filed on Mar. 9, 2012, provisional application No. 61/704,127, filed on Sep. 21, 2012.

(51) Int. Cl.
*A23L 7/10*    (2016.01)
*A23L 27/00*    (2016.01)

(52) U.S. Cl.
CPC ............... *A23L 7/197* (2016.08); *A23L 27/84* (2016.08); *A23L 27/88* (2016.08)

(58) Field of Classification Search
CPC .. A21D 2/181; A23L 1/22075; A23L 1/22091
See application file for complete search history.

(56) References Cited

U.S. PATENT DOCUMENTS

| | | |
|---|---|---|
| 3,904,774 A | 9/1975 | Dymsza |
| 3,966,986 A | 6/1976 | Hunter |
| 3,981,774 A | 9/1976 | Hitzman |
| 3,992,147 A | 11/1976 | Christian |
| 4,058,621 A | 11/1977 | Hill |
| 4,123,589 A | 10/1978 | Korlatzki |
| 4,155,770 A | 5/1979 | Doumani |
| 4,156,742 A | 5/1979 | Babcock |
| 4,206,243 A | 6/1980 | Schlingmann |
| 4,234,613 A | 11/1980 | Lewis |
| 4,259,359 A * | 3/1981 | Spicer .............................. 426/62 |
| 4,400,390 A | 8/1983 | Pittet |
| 4,404,184 A | 9/1983 | Pittet |
| 4,439,525 A | 3/1984 | Shay |
| 4,446,161 A | 5/1984 | Friedman |
| 4,465,702 A | 8/1984 | Eastman |
| 4,517,120 A | 5/1985 | Roychoudhury |
| 4,540,590 A * | 9/1985 | Harada .................. A23L 1/1613 426/324 |
| 4,601,986 A | 7/1986 | Wegner |
| 4,774,095 A | 9/1988 | Kleinschmidt |
| 4,794,006 A | 12/1988 | Boni |
| 4,906,487 A | 3/1990 | Delmas |
| 4,997,976 A | 3/1991 | Brunengraber |
| 5,023,102 A | 6/1991 | Given, Jr. |
| 5,225,219 A | 7/1993 | Inglett |
| 5,254,673 A | 10/1993 | Cook |
| 5,286,512 A | 2/1994 | Klemann |
| 5,512,313 A | 4/1996 | Cooper |
| 5,531,982 A | 7/1996 | Gaffar |
| 5,580,491 A | 12/1996 | Phillips |
| 5,681,505 A | 10/1997 | Phillips |
| 5,851,578 A | 12/1998 | Gandhi |
| 5,922,379 A | 7/1999 | Wang |
| 5,989,526 A | 11/1999 | Aaslyng |
| 6,017,573 A * | 1/2000 | Baker .................... A23K 1/186 426/451 |
| 6,162,475 A | 12/2000 | Hagenmaier |
| 6,183,794 B1 | 2/2001 | Kaesler |
| 6,660,311 B2 * | 12/2003 | Goedeken et al. ............. 426/27 |
| 6,709,691 B2 | 3/2004 | Skiff |
| 6,749,879 B2 | 6/2004 | Broz |
| 6,818,243 B2 | 11/2004 | Nagashima |
| 7,014,876 B2 | 3/2006 | Iwasaki |
| 7,144,592 B2 | 12/2006 | Rader |
| 7,261,769 B2 | 8/2007 | Bhaskaran |
| 7,455,872 B2 | 11/2008 | Salemme |
| 7,455,997 B2 | 11/2008 | Hughes |

(Continued)

FOREIGN PATENT DOCUMENTS

| | | |
|---|---|---|
| CN | 101035443 | 9/2007 |
| CN | 101516966 | 8/2009 |

(Continued)

OTHER PUBLICATIONS

Burdock, G.A. 2005. Fenaroli's Handbook of Flavor Ingredients. 5th Ed. CRC Press. pp. 388-389.*
Triangle Test. Society of Sensory Professionals. 2018. Downloaded from https://www.sensorysociety.org/knowledge/sspwiki/pages/triangle%20test.aspx on Mar. 6, 2018.*
PCT International Search Report and Written Opinion of the International Searching Authority dated Jun. 17, 2013 for International Application No. PCT/US2013/029662, 10 pages.
DiStefano, R., et al., "Principal Parameters of Grape Ripening and Wine Fermentation." In Hyphenated Techniques in Grape and Wine Chemistry, 2008, p. 20.

(Continued)

*Primary Examiner* — Nikki H. Dees

(74) *Attorney, Agent, or Firm* — Fitch, Even, Tabin & Flannery LLP

(57) ABSTRACT

Comestibles prepared using 1,3-propanediol may include modified flavor profiles relative to comparable comestibles that do not include 1,3-propanediol. Further 1,3-propanediol may be used in low concentrations, such as about 0.01 to about 5 wt. % in comestibles to effect modification of flavor profiles including perception of oxidized whole grain wheat flavors and the like.

11 Claims, 1 Drawing Sheet

(56) References Cited

U.S. PATENT DOCUMENTS

| | | |
|---|---|---|
| 7,582,215 B2 | 9/2009 | Hughes |
| 7,608,191 B2 | 10/2009 | Hughes |
| 7,638,155 B2 | 12/2009 | Irwin |
| 7,744,944 B2 | 6/2010 | Binder |
| 7,842,320 B2 | 11/2010 | Baydo |
| 7,867,400 B2 | 1/2011 | Hughes |
| 8,067,193 B2 | 11/2011 | Hughes |
| 8,101,223 B2 | 1/2012 | Renes et al. |
| 2001/0018085 A1 | 8/2001 | Coutandin |
| 2003/0021883 A1 | 1/2003 | Skiff |
| 2004/0036752 A1 | 2/2004 | Botros |
| 2006/0088627 A1 | 4/2006 | Bartnick |
| 2006/0188548 A1 | 8/2006 | Mattson |
| 2006/0193960 A1 | 8/2006 | Wilson |
| 2006/0286276 A1 | 12/2006 | Salemme |
| 2007/0116820 A1 | 5/2007 | Prakash et al. |
| 2007/0241306 A1 | 10/2007 | Wehner |
| 2007/0275139 A1 | 11/2007 | Joerger et al. |
| 2008/0058410 A1 | 3/2008 | Kim |
| 2008/0176957 A1 | 7/2008 | Joerger |
| 2008/0260900 A1 | 10/2008 | Wittorff |
| 2009/0035426 A1 | 2/2009 | Verrall |
| 2009/0053385 A1 | 2/2009 | Fry |
| 2009/0110798 A1 | 4/2009 | Gusek |
| 2009/0117226 A1 | 5/2009 | Hallberg |
| 2009/0155446 A1 | 6/2009 | Reiss |
| 2009/0162488 A1 | 6/2009 | Bell |
| 2009/0246330 A1 | 10/2009 | Zhong |
| 2009/0263556 A1 | 10/2009 | Blondeel |
| 2009/0297665 A1 | 12/2009 | Bromley |
| 2009/0311368 A1 | 12/2009 | Wittorff |
| 2010/0034925 A1 | 2/2010 | Pibarot |
| 2010/0069510 A1 | 3/2010 | Schafer |
| 2010/0130422 A1 | 5/2010 | Bernaert |
| 2010/0189845 A1 | 7/2010 | Grover |
| 2010/0323066 A1 | 12/2010 | Comstock |
| 2011/0151051 A1 | 6/2011 | Neergaard |
| 2011/0206802 A1 | 8/2011 | Flynn |
| 2011/0230343 A1 | 9/2011 | Schroers |
| 2011/0293789 A1 | 12/2011 | Blondeel |
| 2012/0027890 A1 | 2/2012 | Cerne |
| 2012/0107477 A1 | 5/2012 | Siegel |
| 2013/0236597 A1 | 9/2013 | Dierbach |

FOREIGN PATENT DOCUMENTS

| | | |
|---|---|---|
| CN | 101816420 | 9/2010 |
| JP | 2011073979 | 4/2011 |
| WO | 2005102071 | 11/2005 |
| WO | 2007095255 A2 | 8/2007 |
| WO | 2009076136 A1 | 6/2009 |
| WO | 2010/141889 A1 | 12/2010 |
| WO | 2013134607 | 9/2013 |
| WO | 2013134611 | 9/2013 |

OTHER PUBLICATIONS

Jiang, Bao., et al., "Volatile Compounds of Young Wines from Cabernet Sauvignon, Cabernet Gernischet and Chardonnay Varieties Grown in the Loess Plateau Region of China." Molecules, 2010, vol. 15, pp. 9184-9196.

Kawai, Shigeru., et al., "Identification of New Constituents of Cider Vinegar by 13C-NMR Spectroscopic Study." Agriculture Biology Chemistry, vol. 55, No. 10, 1991, pp. 2633-2635.

Ran, Huasong, et al., "The Utility and Market of 1,3-Propanial." Guangdong Chemical Industry, Oct. 2006, vol. 33, No. 162, pp. 29-32 and 36, with English Abstract.

Burdock, George A., "Fenaroli's Handbook of Flavor Ingredients." Fifth Edition, 2005, 810, pp. 27-28.

\* cited by examiner

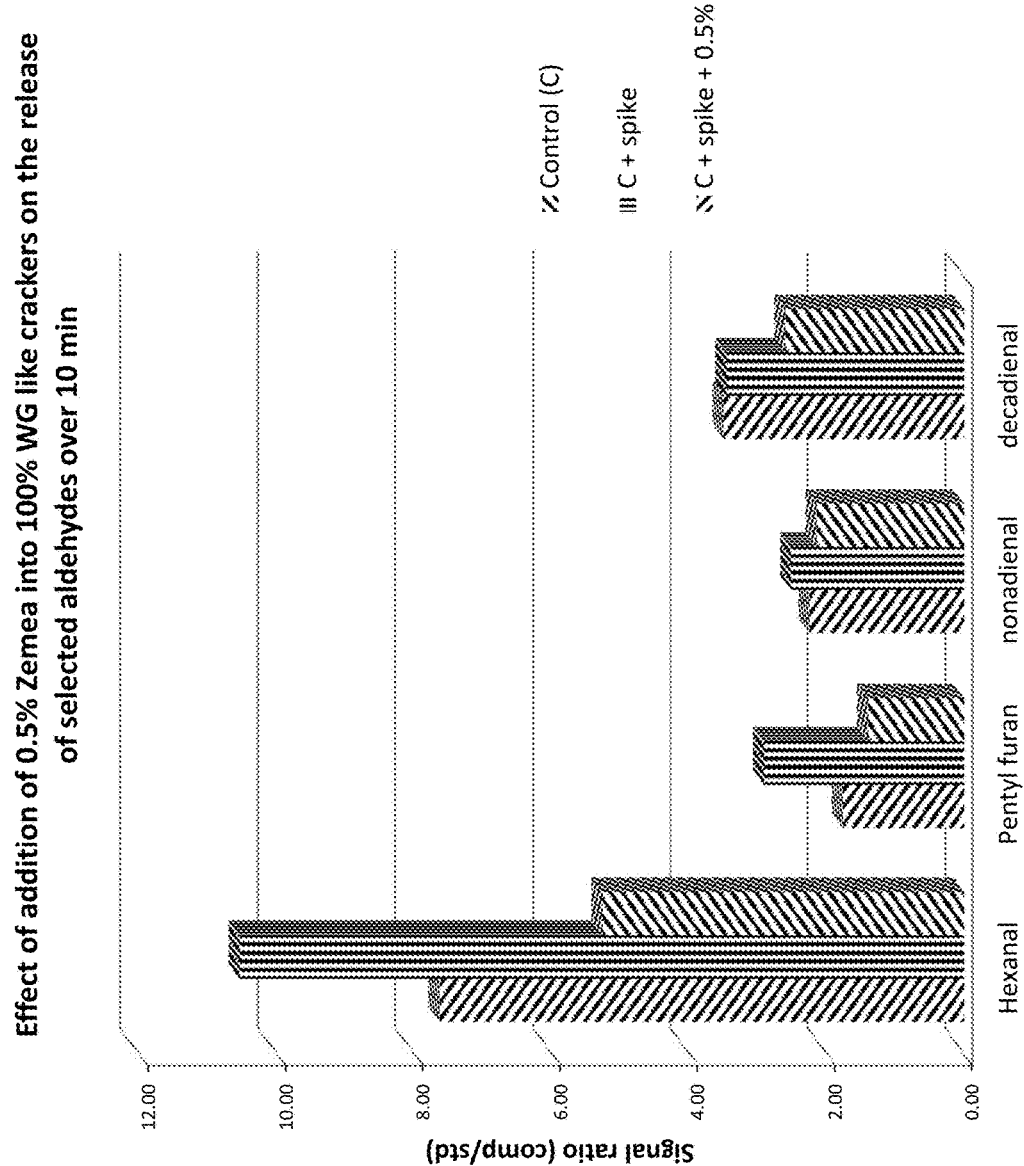

OXIDIZED FLAVOR NOTE SUPPRESSION IN COMESTIBLES

CROSS-REFERENCE TO RELATED APPLICATIONS

This application claims priority to Application No. 61/609,044, filed Mar. 9, 2012, and Application No. 61/704,127, filed Sep. 21, 2012, both of which are incorporated by reference herein in their entirety.

FIELD OF THE INVENTION

This application is directed to modification of flavor profiles and flavor perception. More specifically, this application is directed to the use of compounds such as 1,3-propanediol for modifying flavor profiles and flavor perception in comestibles.

BACKGROUND 1,2-propanediol, also known as propylene glycol, is commonly included in a variety of food products. The U.S. Food and Drug Administration has classified propylene glycol as "generally recognized as safe" (GRAS) for use as a food additive. Propylene glycol is used for many purposes, including, but not limited to, as a humectant, preservative, or stabilizer.

The use of propylene glycol is often limited by the flavor imparted by propylene glycol to the food or beverage product to which it is included. In many applications, propylene glycol is perceived by consumers as contributing an undesirable artificial flavor to the food or beverage.

Further, propylene glycol is an artificial ingredient. There has recently been an interest in using more natural food ingredients, and therefore, alternatives to propylene glycol would be desirable for use in comestibles, foods and other beverage products.

Additionally, certain foods, such as foods containing whole grain materials, tend to have flavor notes that some consumers may not prefer. For example, whole grain flour, such as used in crackers, breads and the like, may impart wheat flavor notes. Many consumers prefer the flavors of white flour, which has been processed such that it does not include much, if any, wheat flavor notes, and therefore avoid products which include whole grain flour. It is believed that at least some of these wheat flavor notes may be attributed to oxidation, such as oxidation of lipids.

However, whole grain materials generally contain important nutritional benefits which are lacking in processed flour, such as white flour. Therefore, it may be desirable to provide compositions which include whole grain materials, such as whole grain flour, but do not have as intense of wheat flavor notes.

SUMMARY 1,3-propanediol is a polar solvent that can be prepared from corn sugar and is generally considered a natural product. 1,3-propanediol has been promoted for use in personal care formulations and cosmetics but is not known to be commonly used in the food industry. 1,3-propanediol generally has similar properties (e.g., structure, molecular weight, and polarity) as propylene glycol and was expected to provide similar properties and taste characteristics as propylene glycol. It has been unexpectedly found that 1,3-propanediol may be used in comestibles to modify the flavor profile compared to similar foods which do not contain 1,3-propanediol. Further, in some approaches, comestibles prepared with 1,3-propanediol exhibit modified flavor profiles compared to foods prepared with propylene glycol.

In some approaches, 1,3-propanediol may be used in comestibles as described below in relatively low amounts, such as, for example, about 0.01 to about 10 wt. % on a dry basis and in other approaches, about 0.2 to about 2 wt. %, to effect a modification of the flavor profile of the comestible relative to a comparative comestible which does not include 1,3-propanediol.

In one form, 1,3-propanediol may be used to modify the flavor profile of comestibles containing whole grain components. For example, in one form, 1,3-propanediol can be used with whole grain components such as whole grain flour to modify the wheaty flavor profile of the comestible. In other forms, 1,3-propanediol can be used with unrefined whole grain components, such as whole grain flour as opposed to white flour, to modify the flavor profile. Further, in other forms, 1,3-propanediol can be used with certain whole grain components that have increased wheaty flavor profiles. For example, whole grain flour that has been aged for longer periods of time may tend to oxidize and impart more wheaty flavors than fresher whole grain flour. In some forms, 1,3-propanediol can be used with older whole grain components and provide at least the same flavor profile as fresh whole grain components and/or refined components, such as white flour. Additionally, the use of 1,3-propanediol in comestibles may help to delay noticeable wheaty and/or oxidized flavors in the comestible during the respective shelf life of the comestible. Therefore, a consumer may be more willing to consume a comestible that is approaching the end of its shelf life.

In other approaches, 1,3-propanediol may be used in comestibles in a range of about 0.05 to about 10 wt. % based on the total amount of whole grain in the comestible. In another form, 1,3-propanediol may be used in comestibles in a range of about 0.5 to about 5 wt. %, in other forms about 0.1 to about 3.5 wt. %, and in other forms, about 1 to about 3 wt. %, each based on the total amount of whole grain in the comestible. According to one form, the whole grain is in the form of whole grain flour.

In one form, the 1,3-propanediol may be used in an amount such that the 1,3-propanediol does not provide a perceptible added flavor. Further, the 1,3-propanediol may be used in an amount such that it does not function to mask the flavor profile of the comestible, but instead otherwise functions to modify the flavor profile of the comestible.

In one approach, 1,3-propanediol may be used in a variety of different comestibles. For example, 1,3-propanediol may be used in comestibles containing wheat flavor notes and/or comestibles which contain ingredients which typically provide wheat flavor notes. According to one approach, the 1,3-propanediol may be provided in an amount such that it decreases wheat flavor notes relative to a comparative comestible which does not include 1,3-propanediol. In yet another approach, 1,3-propanediol may be used in other comestibles such as whole grain containing comestibles, including crackers, biscuits, cookies, cereals, breads, pizza crust, pasta, croissants, rolls, wheat flour tortillas, cakes, muffins, pita bread, and the like.

Further, 1,3-propanediol may be used in ratios to certain other components in the comestible to modify the flavor profile relative to a comparative comestible which does not include 1,3-propanediol. For example, in one approach, the ratio of a whole grain containing component such as whole grain flour to 1,3-propanediol is about 20:1 to about 2000:1.

In other forms, the ratio of whole grain containing component to 1,3-propanediol is about 100:3 to about 100:1.

According to one approach, the use of 1,3-propanediol provides a decrease in oxidized grassy flavor of oxidized oil. In one approach, the use of 1,3-propanediol provides a decrease in oxidized off flavors from whole grain. It should be noted that some consumers perceive these oxidized flavors as being associated with off flavors from whole grain materials. In some forms, consumers may associate the flavors with wheat flavor notes.

According to one form, the whole grain component is whole grain flour. This includes germ, bran and endosperm.

In one form, 1,3-propanediol is provided in a range of about 0.1 to about 3.5 wt. % based on the weight of the whole grain component.

In accordance with one form, 1,3-propanediol is provided in a range of about 1 to about 3 wt. % based on the weight of the whole grain component.

According to one form, the whole grain component is selected from the group consisting of wheat, oat, barley, maize, brown rice, faro, spelt, emmer, rye, quinoa, amaranth, triticale, buckwheat and combinations thereof.

In one form, the whole grain component has been aged for at least 3 months prior to incorporation into the comestible.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 1 is a graph illustrating the effect of 1,3-propanediol on crackers that have been spiked with selected aldehyde compounds.

DETAILED DESCRIPTION

In some approaches, 1,3-propanediol may be used in comestibles as described below in relatively low amounts to effect a modification of the flavor profile of the comestible relative to a comparative comestible which does not include 1,3-propanediol. In one form, the 1,3-propanediol may be used in an amount such that the 1,3-propanediol does not provide a perceptible added flavor. Further, the 1,3-propanediol may be used in an amount such that it does not function to mask the flavor profile of the comestible, but instead otherwise functions to modify the flavor profile of the comestible.

In one form, 1,3-propanediol may be used to modify the flavor profile of comestibles containing whole grain components. For example, in one form, 1,3-propanediol can be used with whole grain components, such as whole grain flour, to modify the wheaty flavor profile of the comestible. In other forms, 1,3-propanediol can be used with unrefined whole grain components, to modify the flavor profile. Further, in other forms, 1,3-propanediol can be used with certain whole grain components that have increased wheaty flavor profiles, such as aged whole grain components. Additionally, the use of 1,3-propanediol in comestibles may help to delay noticeable wheaty and/or oxidized flavors in the comestible during the respective shelf life of the comestible. Therefore, a consumer may be more willing to consume a comestible that is approaching the end of its shelf life.

While 1,3-propanediol is described herein as providing suppression of oxidized flavor notes, it should be understood that other similar compounds may also provide such functionality. For example, 1,3-butandiol and 1,3-propanediol may provide similar functionality. It is theorized that the 1,3 position of the alcohol groups within the diol was important to suppression. However, it should be noted that the 1,3 position may not be specific to diols such that other groups may be positioned at the 1,3 position.

Due to similarities in structure, molecular weight, and polarity it was believed that 1,3-propanediol would be a suitable natural alternative to 1,2-propanediol for use in comestibles. Because of the similar properties, it was expected that the two solvents would exhibit similar flavor release profiles in comestibles such as concentrated flavors and complex food systems. However, it was unexpectedly found that there was a difference in flavor profiles when 1,3-propanediol was used. For example, in one form, the flavor profile is less wheaty and/or oxidized with a flavor profile similar to refined flour, such as white flour. Without intending to be limiting, it is hypothesized that such a flavor profile modification may result from a suppression of aldehydes, dienals and the like.

Further, it does not appear that this difference is correlated to solubility or volatility of the relevant flavor compounds. Moreover, 1,3-propanediol may be used in low amounts, such as about 0.01 to about 10 wt. % on a dry weight basis in comestibles to modify the flavor profiles relative to comestibles which do not contain 1,3-propanediol. In other forms, 1,3-propanediol may be used in amounts such as about 0.1 to about 3.5 wt. % on a dry weight basis. The amount of 1,3-propanediol may also be used in an range of about 0.05 to about 5 wt. %, in other forms about 0.1 to about 3.5 wt. % and in other forms about 0.5 to about 3 wt. %, each based on the total amount of the whole grain component.

In one form, the amount of 1,3-propanediol is such that the 1,3-propanediol itself is not perceived in the comestible. According to one form, 1,3-propanediol may be included in the comestible in an amount of about 0.01 to about 2 wt. %. In another form, 1,3-propanediol is included in an amount of from about 0.05 to about 5 wt. % based on the whole grain component. In another form, 1,3-propanediol is present in a comestible in an amount of about 0.1 to about 3.5 wt. % based on the whole grain component. According to one form, 1,3-propanediol is present in a comestible in an amount of about 0.1 to about 1 wt. % of the whole grain component. In yet another form, 1,3-propanediol is present in a comestible in an amount of about 0.1 to about 3 wt. % of the whole grain component. In one form, the comestible may include a whole grain component, such as whole grain flour, along with a refined material such as white flour. In this regard, the amount of 1,3-propanediol may be based on the amount of whole grain component. In another form, the amount of 1,3-propanediol may be based on the total amount of flour, including both whole grain and white flour.

The use of 1,3-propanediol can modify a number of different flavor profiles depending on the components found in the comestible. For example, 1,3-propanediol may be used with comestibles containing whole grains to modify the oxidized whole grain flavor profile. It is believed that this wheaty flavor profile may originate from the oxidation of lipids or free fatty acids, such as linoleic acid and linolenic acid in whole grains. For example, these materials may oxidize to form aldehydes such as hexanal, decadienal, nonadienal, 3,5-octadien-2-one, 1-octen-3-one and pentyl furan, which may cause oxidized flavor notes. While not intending to be limiting, it is hypothesized that 1,3-propanediol may suppress the release of undesired notes while enhancing the impact of desired notes.

Whole grain components may include any type and form of whole grain components. For example, such whole grain components include, but are not limited to, wheat, oat, barley, maize, brown rice, faro, spelt, emmer, rye, quinoa, amaranth, triticale, buckwheat and the like. Further, the whole grain component may take a variety of forms including, but not limited to, whole grain flour, wheat flour, intact, ground, flaked, cracked, etc. forms of grains and/or portions of grains as constituting whole grains. In one form, the whole grain component includes germ, bran and/or endosperm, though other components are also contemplated.

A variety of different comestibles may be manufactured using 1,3-propanediol. For example, 1,3-propanediol may be used in such comestibles as whole grain containing comestibles including crackers, cookies, cereals, biscuits, breads, pizza, pasta and the like. It has been found that 1,3-propanediol, when used with a comestible containing a whole grain component, can modify the oxidized flavor of the comestible relative to a comestible that does not include 1,3-propanediol. For example, 1,3-propanediol can be used with oils, fats, whole grain flour, wheat flour (white flour) and the like. It should be appreciated that this is simply an exemplary listing of comestibles and that 1,3-propanediol may be used in a variety of other comestibles.

The ranges and ratios of 1,3-propanediol may be modified to accommodate different types of comestibles. For example, in one form, crackers may include from about 0.05 to about 5 wt. % 1,3-propanediol, and in other forms, about 0.1 to about 3.5 wt. %, based on the whole grain component. In other forms, similar ranges may be used for other baked goods. According to one form, 1,3-propanediol may be used in pasta in a range from about 0.5 to about 5 wt. %, and in other forms, about 1 to about 3 wt. %, based on the whole grain component.

The comestible may also include a variety of other components such as acids, flavors, preservatives and the like. Further, the amount of 1,3-propanediol may vary depending on these other components. For example, with strong flavors such as strawberry, chocolate, and cherry, the perception of wheaty flavors may be somewhat masked such that the amount of 1,3-propanediol may be lower than a similar comestible that does not include the strong flavors. Other comestibles, such as crackers and bread which do not include strong flavors, may permit wheaty and/or oxidized flavors to be more perceptible such that the amount of 1,3-propanediol may be increased.

In some aspects, the comestible may further include a sweetener. Useful sweeteners may include both nutritive and non-nutritive sweeteners, including both low intensity and high intensity sweeteners, such as, for example, honey, corn syrup, high fructose corn syrup, erythritol, sucralose, aspartame, stevia, saccharine, monatin, luo han guo, neotame, sucrose, Rebaudioside A (often referred to as "Reb A"), fructose, cyclamates (such as sodium cyclamate), acesulfame potassium, and combinations thereof.

In one form, the 1,3-propanediol is provided in an amount such that the 1,3-propanediol does not itself provide flavor to the comestible, but instead otherwise modifies the flavor profile of the comestible depending on the other components as described herein. In some forms, depending on the comestible, 1,3-propanediol may begin imparting a flavor at about 10 wt. % or higher. In other forms, 1,3-propanediol may begin imparting a flavor at about 5 wt. % or higher. Depending on the comestible, the imparted flavor may not be desirable.

The amount of 1,3-propanediol may also be varied based on the other components of the comestible and the form of the comestible. For example, when used in a comestible including a whole grain containing component, 1,3-propanediol may be included in an amount of about 0.01 to about 2 wt. %.

Similarly, the ratio of 1,3-propanediol to certain components in the comestible may be varied to provide a modified flavor profile relative to a comparative comestible that does not include 1,3-propanediol. For example, when used in a comestible having a whole grain containing component, the ratio of the whole grain containing component to 1,3-propanediol is about 20:1 to about 2000:1. In another form, the ration of the whole grain component to 1,3-propanediol is about 100:1 to about 100:3. Other ratios are also contemplated depending on the comestible.

The comestibles including 1,3-propanediol may be prepared in a conventional manner, such as by mixing the 1,3-propanediol with the remaining components. In one form, the 1,3-propanediol is added to the comestible prior to storage. 1,3-propanediol may also be added at different stages of processing the comestible. For example, depending on the type of comestible, it may be desirable to add 1,3-propanediol with the whole grain component. In other forms, it may be desirable to add 1,3-propanediol before or after the whole grain component. In yet other forms, 1,3-propanediol may be added at any stage of processing of the comestible.

EXAMPLES

Examples were prepared using 1,3-propanediol in various comestibles to analyze the flavor profile modification in each.

Example 1

Example 1 was prepared to compare the effects of 1,3-propanediol with soy bean oil. A control oil (20% oil, 1% carboxymethylcellulose and 0.3 wt. % quiala extract emulsifier) was compared to Inventive Sample A that also included 0.3 wt. % 1,3-propanediol. The oils were tasted by a panel of five taste testers. All five tasters indicated that Sample A was less grassy and oxidized flavored than the control.

Example 2

Example 2 was prepared to compare the effects of 1,3-propanediol when used in whole grain crackers. Benchtop samples were prepared using ingredients as found in Table 1 below.

TABLE 1

| Formula | Ingredients | Amount (g) |
|---------|-------------|------------|
| Stage 1 | Salt | 3-4.5 g |
|  | Calcium phosphate | 5.5-7.2 g |
|  | Sodium bicarbonate | 5.5-7.3 g |
|  | Whole Grain Flour | 420-610 g |
| Stage 2 | Sugar | 35-50 g |
|  | Oil | 40-80 g |

TABLE 1-continued

| Formula | Ingredients | Amount (g) |
|---|---|---|
| | Water | 150-250 g |
| | Table 2 Component | Refer Table 2 |
| Stage 3 | Leavening agent | 5.5-7.2 g |

Generally, the control crackers were prepared by first mixing the Stage 1 ingredients. Next, the Stage 2 ingredients were combined by dissolving the sugar and then adding the leavening agent. The combined Stage 2 and Stage 3 ingredients were then added to the Stage 1 ingredients to form a dough. The dough was transferred into a plastic bag and then placed in a proof box at 80-100° F. for one hour. The dough was placed in a sheeter and then cut with a cookie cutter. The cut, raw dough was then placed in an oven on a preheated baking sheet for five minutes at 400-500° F. The moisture content was targeted between 1-4%. The samples were stored in plastic bags at room temperature for 15 days before evaluation.

Experimental and comparative samples were prepared similarly with varying amounts of 1,3-propanediol, glycerine or propylene glycol, each based on the weight of whole grain flour, being added with the Stage 2 ingredients. The amounts of the added materials as well as taste evaluations by a panel are shown below in Table 2.

TABLE 2

| Sample | Ingredient Modification | Evaluation |
|---|---|---|
| B | Control (no modification) | |
| C | 0.2% glycerin | Oxidized whole grain characters, doughy, astringent |
| D | 0.2% 1,3-propanediol | White flour notes, slightly oxidized flavor |
| E | 0.2% propylene glycol | Baked, toasted and oxidized whole grain notes, cardboard flavor |
| F | 0.5% glycerin | Doughy, oxidized whole grain flavor |
| G | 0.5% 1,3-propanediol | Sweet baked, white flour, flat overall flavor, late oxidized whole grain flavor |
| H | 0.5% propylene glycol | Sweeter, oxidized whole grain character |

As shown in Table 2, the samples containing glycerine were the least preferred. Further, it appears that the addition of 1,3-propanediol suppresses the oxidized whole grain flavor and enhances positive flour notes, such as white flour notes.

It was noted that, in certain circumstances, 1,3-propanediol may have a more significant effect on suppressing oxidized flavor notes in compositions which contain whole grain materials that are older, more oxidized and not as fresh. For example, 1,3-propanediol may show a more significant effect on suppressing oxidized flavor notes in composition with wheat flour that is older than 30 days.

Example 3

Example 3 was prepared to compare the effect of 1,3-propanediol with various aldehydes. More specifically, cracker samples were prepared and were spiked with selected aldehydes (hexanal, pentyl furan, nonadienal and decadienal). It is generally thought that aldehydes such as these contribute to perceived whole wheat oxidized flavor notes. The cracker samples were prepared as discussed in Example 2 and were spiked during preparation with between 0.05-0.1 mg/kg of the aldehydes shown found in FIG. 1. Each set of samples was spiked with the same amount of the respective aldehyde.

The control (C) indicated a cracker sample without any aldehydes and without 1,3-propanediol. The control is shown as the left bar for each aldehyde reference. The middle bar in for the respective aldehydes in FIG. 1 represent samples which include between 0.05-0.1 mg/kg of the respective aldehydes added to the control dough before baking. The right hand bar represents samples that were spiked with between 0.05-0.1 mg/kg of the respective aldehydes along with 0.5% by weight of 1,3-propanediol before baking. The 1,3-propanediol used was Zemea®, a product sold by DuPont.

The samples were each tested to measure the signal ratio of the release of the aldehydes over a 10 minute period. Signal ratio was calculated based on each compound individual signal versus the signal from an internal standard of known concentration spiked into the sample. A dynamic headspace technique in conjunction with gas chromatography and mass spectrometry (GC-MS) were used for the analysis of the samples. As shown in FIG. 1, each of the samples which included 1,3-propanediol had a lower signal ratio than the samples which were spiked and did not contain 1,3-propanediol. Additionally, the samples containing 1,3-propanediol also had the same, if not lower signal ratio than the control samples which did not contain any aldehydes. Therefore, it appears that the addition of 1,3-propanediol may slow down the release of selected aldehydes over time, thereby suppressing at least some whole wheat oxidized flavor notes.

Example 4

Example 4 was prepared to illustrate the use of 1,3-propanediol in a pilot plant setting. Pilot plant samples were prepared using ingredients as found in Table 3 below.

TABLE 3

| Ingredients | Percent |
|---|---|
| Group 1 | |
| Oil | 7.0-11% |
| Sugar | 4.0-7.0% |
| Water | 20-30% |
| Salt | 1.0-2.0% |
| Calcium Phosphate | 1.0-2.0% |
| 1,3-propanediol | 0.1-5.0% based on whole grain flour |
| Group 2 | |
| Whole Grain Flour | 40-65% |
| SODIUM BICARBONATE | 0.5-2.0% |
| Group 3 | |
| Leavening agent | 1.0-3.0% |

The samples in Example 4 were prepared by combining the ingredients in Group 1 in a large mixer and mixing for six to ten minutes. Next, the ingredients from Groups 2 and 3 were added to the Group 1 mixture and mixed for an additional ten to fifteen minutes to form a raw dough. The raw dough was removed from the mixer and proofed for 60-120 minutes at 80-100° F. The samples were then cut and baked at 400-500° F. for 3.5-6 minutes. Each of the samples had a moisture target of between 1-4%. The samples were evaluated by a panel to characterize the flavor notes.

Sample I was prepared as a control with no 1,3-propanediol added to the dough. The panel indicated that Sample I was bitter, grassy with an oxidized whole grain flavor.

Sample J was prepared with 0.06% by weight 1,3-propanediol. The panel indicated that Sample J was less bitter than the control. Further, the panel indicated that Sample J had oxidized whole grain flavors and plain flavors with white flour notes.

Sample K was prepared with 0.15% by weight 1,3-propanediol. The panel indicated that Sample K had a sweetness similar to white flour and a clean overall flavor. The panel indicated that Sample K did not have an oxidized whole grain flavor or a bitter flavor.

Sample L was prepared with 0.3% by weight 1,3-propanediol. The panel indicated that Sample L was not grassy or bitter, but did have a burning aftertaste.

Overall, in Example 4, the panel preferred Sample K with 0.15% by weight 1,3-propanediol. However, Samples J-L all were less grassy and had a less oxidative whole grain flavor with less bitterness compared to the control.

Example 5

Example 5 was prepared to analyze the use of 1,3-propanediol with pasta. A standard pasta composition was prepared using refined white flour with no 1,3-propanediol. The pasta was cut into ¼" long strips and then boiled. The resulting pasta had a thickness of approximately ¹⁄₁₆" after boiling. A panel of trained taste testers trained to recognize different attributes of whole grain pasta flour were used to analyze the control and compare it to the other sample pasta preparations.

Pasta Sample 1 was prepared in accordance with the control, but the 50% of the refined white flour was replaced with whole grain flour that was aged less than three months. Further, the pasta included 1.5 wt. % 1,3-propanediol based on the weight of total flour. Tasters reported that Pasta Sample 1 was good, had a low wheaty flavor and a sweet flavor. Pasta Sample 1 did have some whole grain notes.

Pasta Sample 2 was prepared in accordance with Pasta Sample 1, but included 2.0 wt. % 1,3-propanediol based on the weight of total flour. Tasters reported that Pasta Sample 2 was good with low wheaty flavor and a sweet flavor. Further, tasters reported that Pasta Sample 2 had a cleaner flavor profile than Pasta Sample 1.

Pasta Sample 3 was also prepared in accordance with Pasta Sample 1, but included 2.5 wt. % 1,3-propanediol based on the weight of total flour. Tasters reported that Pasta Sample 3 had a metallic, tingling sensation with a metallic, lingering aftertaste.

Pasta Sample 4 was also prepared in accordance with Pasta Sample 1, but included 3.0 wt. % 1,3-propanediol based on the weight of total flour. Tasters reported that Pasta Sample 4 had similar taste profile as Pasta Sample 4 and was too strong.

Pasta Sample 5 was also prepared in accordance with Pasta Sample 1, but included 3.5 wt. % 1,3-propanediol based on the weight of total flour. Tasters reported that Pasta Sample 5 had an even stronger flavor profile with the same characteristics as Pasta Samples 3 and 4.

Pasta Sample 6 was also prepared in accordance with Pasta Sample 1, but included 4.0 wt. % 1,3-propanediol based on the weight of total flour. Tasters reported that Pasta Sample 6 was bitter and salty with low sweetness with whole grain flavors.

Pasta Sample 7 was prepared in accordance with the Control and included 90% white flour and 10% whole grain flour that was aged less than three months for the overall flour component. Further, Pasta Sample 7 included 2.5 wt. % 1,3-propanediol based on the weight of total flour. Tasters reported that the used of 1,3-propanediol was too high for the amount of refine, white flour which inherently includes a cleaner overall flavor profile in view of the lower amount of whole grain.

Pasta Sample 8 was prepared in accordance with the Control but replaced 50% of the refined white flour with whole grain flour that was aged at least three months. Pasta Sample 8 did not include any 1,3-propanediol. Tasters reported that Pasta Sample 8 had a bitter aftertaste.

Pasta Sample 9 was prepared in accordance with Pasta Sample 8 and further included 2.5 wt. % 1,3-propanediol based on the weight of total flour. Tasters reported that Pasta Sample 9 included some bitterness and more whole grain flavor than in Pasta Samples 1 and 2. Generally, it is believed that the whole grain flour which is aged at least three months had more wheaty and/or oxidized flavors such that a higher ratio of 1,3-propanediol is required.

Pasta Sample 10 was prepared in accordance with Pasta Sample 8 and further included 5.0 wt. % 1,3-propanediol based on the weight of total flour. Tasters reported that Pasta Sample 10 had a stronger wheaty oxidized flavor than Pasta Sample 1 and a similar metallic flavor profile as in Pasta Sample 3.

The results of Example 5 illustrate that, in some forms, pastas that include at least some refined or white flour and/or include fresh whole grain flour, such as having aged less than three months, require less 1,3-propanediol. Further, in such samples, if the 1,3-propanediol is increased, the flavor of the 1,3-propanediol may become perceptible. Further, in samples that contain entirely whole grain flour and/or contain whole grain flour that has been aged for at least three months, a larger amount of 1,3-propanediol is needed. It is believed that an increased amount of oxidized flavors are found in the entirely whole grain samples and that the samples aged at least three months contain a higher proportion of oxidized materials. Therefore, a larger amount of 1,3-propanediol is necessary. Further, in such samples, the amount of 1,3-propanediol can be increased, and in some instances, increased above the tasting threshold for fresh whole grain, and still not be perceptible in the aged samples. In this regard, it should be appreciated that 1,3-propanediol may be used with whole grain materials that are more aged and/or oxidized such that the taste profile of the aged comestible may be adjusted to be similar to fresh whole grain and/or refined white flour.

Example 6

Example 6 was prepared to compare the use of 1,3-propanediol with crackers. Crackers containing 100% whole grain flour and different levels of 1,3-propanediol were made in a pilot plant to analyze different ranges of 1,3-propanediol in crackers. The samples were prepared using the general composition found in Table 4 below.

TABLE 4

| Ingredients | Percent |
| --- | --- |
| Group 1 | |
| Oil | 7.0-11% |
| Sugar | 4.0-7.0% |
| Water | 20-30% |

TABLE 4-continued

| Ingredients | Percent |
| --- | --- |
| Salt | 1.0-2.0% |
| Calcium Phosphate | 1.0-2.0% |
| 1,3-propanediol | 0.1-5.0 wt. % based on whole grain flour |
| Group 2 | |
| Whole Grain Flour | 40-65% |
| SODIUM BICARBONATE | 0.5-2.0% |
| Group 3 | |
| Leavening agent | 1.0-3.0% |

The samples in Example 6 were prepared by combining the ingredients in Group 1 in a large mixer and mixing for six to ten minutes. Next, the ingredients from Groups 2 and 3 were added to the Group 1 mixture and mixed for an additional ten to fifteen minutes to form a raw dough. The raw dough was removed from the mixer and proofed for up to 120 minutes at 80-100° F. The samples were then cut and baked at 400-500° F. for 2-10 minutes. Each of the samples had a moisture target of between 1-7%. The samples were then aged for about 8 weeks.

The samples were evaluated by a trained panel to characterize the flavor notes. The panelists were selected on the basis of their sensory acuity and descriptive ability. The panelists developed a vocabulary to describe the aroma, appearance, flavor, texture and aftertaste of the samples through a series of moderated discussion sessions. The samples were evaluated by the panelists, individually, using the vocabulary they created. The samples were presented blind and in a balanced design to minimize bias due to presentation order. Each panelist evaluated all products for all attributes three times, with a clearing time of 3:00 between samples.

The data were collected using the web-based Compusense data collection system (Compusense at Hand, Canada) and analyzed with the Tragon QDATM software. The unstructured line scale used for evaluation was electronically converted to a 100-point scale for analysis. Analysis of Variance (ANOVA) was applied to the data for each attribute, to determine if there were statistical differences among the samples. If so, the Duncan's minimum significant difference post-hoc test was calculated and applied to that particular attribute in order to determine between which samples the differences existed (p<0.20).

The whole grain flour used for this test was less than 30 days old, according to manufacturing procedures, and cleaner (less aged) in flavor compared with commercial whole grain flour available from most supermarkets.

The samples were evaluated for a number of flavor profiles. One of the flavor profiles, labeled as "Other/Off" was characterized as the intensity of an off flavor such as old oil, rancidity, spoiled, cardboard, etc. A further profile labeled as "Other Grain", characterized as the intensity of any other grain besides white flour, including wheat/whole wheat, bran, rice, etc. was also analyzed.

Samples were prepared with 0 wt. %, 0.05 wt. %, 0.2 wt. %, 1 wt. % and 5 wt. % 1,3-propanediol. Each of the samples was analyzed by the testers and then the evaluations entered into the statistical software as described above.

TABLE 5

Other/Off Flavor Notes

| Composition | Evaluation Score | Statistical Difference |
| --- | --- | --- |
| Dough 7: 5.0% 1,3-propanediol | 27.46 | A |
| Dough 6: 0.05%, 1,3-propanediol | 11.69 | B |
| Dough 4: 100% whole grain, 0% 1,3-propanediol | 11.45 | B |
| Dough 9: 1.0% 1,3-propanediol | 10.41 | B |
| Dough 8: 0.2% 1,3-propanediol | 9.92 | B |
| Dough 5: 0.2% 1,3-propanediol | 8.01 | B |
| Dough 10: Control - no whole grain | 7.42 | B |

TABLE 6

Other Grain Flavor Notes

| Composition | Evaluation Score | Statistical Difference |
| --- | --- | --- |
| Dough 4: 100% whole grain, no 1,3-propanediol | 26.70 | A |
| Dough 9: 1.0%, 1,3-propanediol | 26.25 | A |
| Dough 6: 0.05% 1,3-propanediol | 24.78 | AB |
| Dough 8: 0.2% 1,3-propanediol | 23.64 | ABC |
| Dough 5: 0.2% 1,3-propanediol | 22.40 | ABC |
| Dough 7: 5.0% 1,3-propanediol | 21.26 | ABC |
| Dough 10: Control - no whole grain | 14.61 | D |

In general, the overall data indicated that 1,3-propanediol impacts the sensory attributes of whole grain formulations. For example, the use of 1,3-propanediol can lead to a decrease in the perception of other grain (wheaty) flavor notes.

From Example 6, it was hypothesized that samples containing 1,3-propanediol at 5% were significantly different (80% confidence) than other samples on flavor perception of Other/off notes which could include wheaty related notes. On the other hand in a different attribute called "other grains" there is differentiation between the samples containing 1,3-propanediol and the 100% whole grain control. Therefore, it is hypothesized that addition of 1,3-propanediol provided a cleaner flavor than the cracker made with 100% whole grain flour without 1,3-propanediol.

Further, it was noted that the use of 1,3-propanediol increases the overall aroma and also decreases the wheaty flavor perception. However, at higher amounts, such as 5 wt. % based on the whole grain flour, there is a slight decrease in sweetness perception and a noticeable increase in bitter taste. Further, the samples developed a significant off note (relating to rancid/old oil/cardboard) when 1,3-propanediol was increased to at least about 5 wt. % based on the whole grain flour.

Additional examples were prepared as described below to analyze other flavor and taste perception changes that result from the use of 1,3-propanediol.

Example 7

Example 7 was prepared to compare the use of 1,3-propanediol with menthol. A control was prepared with 0.1 wt. % menthol in water while Sample L was prepared with 0.3 wt. % menthol in water with 0.3 wt. % 1,3-propanediol. It is believed that 1,3-propanediol suppressed bitterness and provided less nasal cooling when combined with menthol than in the control.

Example 8

Example 8 was prepared to compare the effects of 1,3-propanediol with acetic acid. Sample M was prepared with 0.05 wt. % acetic acid in water, Sample N was prepared with 0.05 wt. % acetic acid in water with 0.3 wt. % 1,3-propanediol and Sample O was prepared with 0.05 wt. % acetic acid in water with 0.3 wt. % propylene glycol.

Each of the three testers indicated that Sample O was the least sour with Sample N being more sour and Sample M being the most sour. Therefore, it is believed that 1,3-propanediol increases sourness compared to water when combined with acetic acid.

Example 9

Example 9 was prepared to compare the effects of 1,3-propanediol with lactic acid. Sample P was prepared with 0.25 wt. % lactic acid in water with 0.3 wt. % 1,3-propanediol, Sample Q was prepared with 0.25 wt. % lactic acid in water with 0.3 wt. % propylene glycol and Sample R was prepared with 0.25 wt. % lactic acid in water. The five tasters listed the samples in order of decreasing sourness.

Taster 1—R/Q/P—Sample R being more sour and astringent

Taster 2—R/Q/P—Sample R being metallic, salty and astringent, Sample Q being sharper and astringent, bitter Taster 3—R/P/Q—Sample Q had a slight plastic and bitter taste Taster 4—R/P/Q Taster 5—Samples R and Q had medicinal metallic taste and were more sour, Sample P was smoother and less sour astringent Example 10

Example 10 was prepared to compare the effects of 1,3-propanediol with citric acid. Sample S was prepared with 0.1 wt. % citric acid in water with 0.3 wt. % 1,3-propanediol, Sample T was prepared with 0.1 wt. % citric acid in water with 0.3 wt. % propylene glycol and Sample U was prepared with 0.1 wt. % citric acid in water. The three tasters listed the samples in order of decreasing sourness.

Taster 1—U/S/T
Taster 2—T/U/S
Taster 3—T/U/S

Example 11

Example 11 was prepared to compare a higher concentration of citric acid with 1,3-propanediol. Sample V was prepared with 1 wt. % citric acid in water with 0.3 wt. % propylene glycol, Sample W was prepared with 1 wt. % citric acid in water, and Sample X was prepared with 1 wt. % citric acid in water with 0.3 wt. % 1,3-propanediol.

Taster 1 indicated that Sample W was the most milk tasting with Sample X being less sour than Sample V.

Taster 2 indicated that Sample V and Sample X were similar with Sample W being milder.

Taster 3 indicated that Sample W was less sour than Samples V and X.

Taster 4 indicated that Sample W was the most mellow with Sample V being slightly less sour than Sample X.

Therefore, it is believed that 1,3-propanediol increased sourness perception when combined with citric acid.

Example 12

Example 12 was prepared to compare the effects 1,3-propanediol with malic acid. Sample Y was prepared with 1 wt. % malic acid in water with 0.3 wt. % 1,3-propanediol, Sample Z was prepared with 1 wt. % malic acid in water with 0.3 wt. % propylene glycol and Sample AA was prepared with 1 wt. % malic acid in water.

Taster 1 indicated that Sample Y was less sour.

Taster 2 indicated that Sample Y had an initial sourness, but Samples Z and AA were more sour overall.

Taster 3 indicated that Sample Y was less sour.

Taster 4 indicated that Sample Y had the most upfront sourness while Samples Z and AA were lingering.

Therefore, it is believed that malic acid was more sour upfront, but less lingering when combined with 1,3-propanediol. It is believed that generally, 1,3-propanediol may modify the acid perception, such as intensity and/or timing, in the flavor profile relative to a similar comestible which does not contain 1,3-propanediol.

Example 13

Example 13 was prepared to compare the effects of 1,3-propanediol with tea. Six earl grey tea bags were combined with 250 ml of water for 30 minutes. Sample AB was prepared with 0.3 wt. % 1,3-propanediol, Sample AC was a control and Sample AD was prepared with 0.3 wt. % propylene glycol.

Taster 1 indicated that Sample AB had the least intense flavor, was the least bitter and the least sour. Sample AC was the most sour and astringent.

Taster 2 indicated that Sample AB was the most sour, least bitter, and most astringent. Sample AD was more bitter, less astringent and less sour than Sample AB. In Sample AC, bitter dominated.

Taster 3 indicated that Sample AB was very astringent, the least bitter, and the least sour. Sample AC was bitter and astringent with no sour flavor. Sample AD had a strong bitter flavor, was in the middle for astringent and the most sour.

Taster 4 indicated that Sample AB was floral, bitter with a mild astringency. Sample AC was more astringent and sour. Sample AD was more astringent and bitter.

Therefore, it is believed that when tea is combined with 1,3-propanediol, the flavor profile improved the base with sour, bitter, and astringent characteristics all changed.

Example 14

Example 14 was prepared to compare the effects of 1,3-propanediol with coffee. Robusta instant coffee was prepared with 1 wt. % coffee in water. Sample AE was further prepared with 0.3 wt. % propylene glycol, Sample AF was a control and Sample AG was further prepared with 0.3 wt. % 1,3-propanediol.

Taster 1 indicated that Sample AE was less sour with Sample AF was in the middle for sour and more bitter. Sample AG was the most metallic.

Taster 2 indicated that all samples were bitter with Sample AF being the least bitter and Sample AF the most bitter.

Taster 3 indicated that Sample AE was sour and bitter while Sample AF was more coffee like with some astringency. Sample AG was less sour and less bitter.

Taster 4 indicated that Sample AE was sour, astringent and ashy. Sample AF was more roasted and slightly more bitter, but less sour. Sample AG was ashy, sour and less bitter.

Therefore, it is believed that when coffee is combined with 1,3-propanediol, the flavor profile is less bitter than without 1,3-propanediol.

Example 15

Example 15 was prepared to compare the effects of 1,3-propanediol with dark chocolate cream cheese. A control was compared to Sample AH that included the same amount of components as the control, but also included 0.5 wt. % 1,3-propanediol. All five tasters indicated that Sample AH had a more dark cocoa flavor and a more alkaline cocoa flavor than the control.

Example 16

Example 16 was prepared to compare the effects of 1,3-propanediol with soy bean oil. A control oil (20% oil, 1% carboxymethylcellulose and 0.3 wt. % quiala extract emulsifier) was compared to Sample AI that also included 0.3 wt. % 1,3-propanediol. All five tasters indicated that Sample AI was less grassy and wheaty flavored than the control.

Example 17

Example 17 was prepared to compare the effects of 1,3-propanediol with orange juice. A control was compared to Sample AJ that also included 0.3 wt. % 1,3-propanediol. All three tasters indicated Sample AJ was less bitter, more sweet and rounded at the end.

Example 18

Example 18 was prepared to compare the effects of 1,3-propanediol with 2% milk. A control was compared to Sample AK that also included 0.2 wt. % 1,3-propanediol. All tasters indicated that Sample AK was less fatty, more sweet and less sour.

As seen in these further examples, 1,3-propanediol can be used to modify a variety of different flavor profiles. In some approaches, 1,3-propanediol may be used in comestibles as described below in relatively low amounts, such as, for example, about 0.1 to about 2 wt. % to effect a modification of the flavor profile of the comestible relative to a comparative comestible which does not include 1,3-propanediol. In one form, the 1,3-propanediol may be used in an amount such that the 1,3-propanediol does not provide a perceptible added flavor when used alone in an aqueous system. Further, the 1,3-propanediol may be used in an amount such that it does not function to mask the flavor profile of the comestible, but instead otherwise functions to modify the flavor profile of the comestible.

In one approach, 1,3-propanediol may be used in a variety of different comestibles. For example, 1,3-propanediol may be used in beverages, such as aqueous beverages which contain an acid. According to one approach, the 1,3-propanediol may be provided in an amount such that if modifies the acid profile in the beverage so as to provide a modified bitter and/or sour flavor relative to a comparative comestible which does not include 1,3-propanediol. In yet another approach, 1,3-propanediol may be used in other beverages such as coffee, tea, milk, fruit and vegetable juices and the like. 1,3-propanediol may also be used in concentrates to modify the flavor that are then diluted to make beverages.

1,3-propanediol may also be used in other comestibles to effect a modified flavor profile relative to the same comestible which includes water and/or propylene glycol without (1,3-propanediol) such as in confectioneries, whole grain containing comestibles, mint oil and mint extract containing comestibles and the like. In one approach, the confectionery may include a flavor component selected from cocoa, a caramelization product and/or a Maillard reaction product. In yet another approach, the comestible may include a terpene containing component, such as, for example, menthol, which, when combined with 1,3-propanediol, may exhibit a modified perceived bitterness. According to one approach 1,3-propanediol may be used with a whole grain containing comestible where the 1,3-propanediol is provided to modify the wheaty flavor profile of the comestible.

Further, 1,3-propanediol may be used in ratios to certain other components in the comestible to modify the flavor profile relative to a comparative comestible which does not include 1,3-propanediol. For example, the ratio of acid to 1,3-propanediol may be about 1:2 to about 4:1. In another approach, the ratio of a flavor component to 1,3-propanediol is about 2:1 to about 250:1. According to one approach, the ratio of a terpene containing component to 1,3-propanediol is about 1:5 to about 20:1. In yet another approach, the ratio of a whole grain containing component to 1,3-propanediol is about 10:1 to about 1000:1.

The comestible may also include a variety of other components such as acids, flavors, preservatives and the like.

In one form, an acid included in the comestible, such as in a beverage, can include, for example, any food grade organic or inorganic acid, such as but not limited to citric acid, malic acid, succinic acid, acetic acid, hydrochloric acid, adipic acid, tartaric acid, fumaric acid, phosphoric acid, lactic acid, salts thereof, and combinations thereof. The selection of the acid may depend, at least in part, on the desired pH of the comestible and/or taste imparted by the acid to the diluted final beverage. In another aspect, the amount of acid included in the comestible may depend on the strength of the acid. For example, a larger quantity of lactic acid would be needed in the comestible to reduce the pH in the comestible than a stronger acid, such as phosphoric acid.

As described above, 1,3-propanediol can be used with a variety of different comestibles to modify the flavor profile relative to a comestible that does not include 1,3-propanediol. For example, 1,3-propanediol may also modify the flavor profile of a comestible to decrease the oxidized grassy flavor of oxidized oil and decrease the wheaty off flavor from whole grain.

The foregoing descriptions are not intended to represent the only compositions and use of the ingredients. The percentages provided herein are by weight unless stated otherwise. Changes in form and in proportion of parts, as well as the substitution of equivalents, are contemplated as circumstances may suggest or render expedient. Similarly, while exemplary compositions and methods have been described herein in conjunction with specific embodiments, many alternatives, modifications, and variations will be apparent to those skilled in the art in light of the foregoing description.

What is claimed is:
1. A comestible comprising:
 a whole grain containing component having a flavor profile, the whole grain containing component comprising whole grain flour present in an amount of at least about 50 wt. % based on a total flour content of the comestible, wherein the whole grain component comprises wheat; and
 about 0.75 to about 2 wt. % 1,3-propanediol based on the weight of the whole grain flour, the 1,3-propanediol being present in an amount effective to decrease perception of wheaty flavors compared to a comparative comestible containing the same amount of the same kind of whole grain containing component, but not containing 1,3-propanediol, wherein the comestible is pasta.

2. The comestible of claim 1 having a ratio of the whole grain containing component to 1,3-propanediol of from about 20:1 to about 2000:1.

3. The comestible of claim 1 wherein the whole grain component comprises only whole grain flour.

4. The comestible of claim 1 wherein the whole grain component further comprises at least one of oat, barley, maize, brown rice, faro, spelt, emmer, rye, quinoa, amaranth, triticale, buckwheat and combinations thereof.

5. The comestible of claim 1 wherein the whole grain component has been aged for at least three months prior to incorporation into the comestible.

6. A method of effecting an enhanced flavor profile of a comestible, the method comprising the steps of:
providing a whole grain component providing a flavor profile of the comestible, the whole grain component comprising whole grain flour present in an amount of at least about 50 wt. % based on a total flour content of the comestible, wherein the whole grain component comprises wheat;
providing 1,3-propanediol in an amount of about 0.75 to about 2 wt. % based on the weight of the whole grain flour; and
mixing the whole grain component and the 1,3-propanediol to form the comestible, the 1,3-propanediol being present in an amount effective to decrease perception of wheaty flavors compared to a comparative comestible containing the same amount of the same kind of whole grain component, but not containing 1,3-propanediol.

7. The method of claim 6 wherein the whole grain component and the 1,3-propanediol are provided in a ratio of the whole grain component to 1,3-propanediol of from about 20:1 to about 2000:1.

8. The method of claim 6 wherein the flavor profile is modified to provide a reduced oxidized wheaty flavor.

9. The method of claim 6 wherein the whole grain component comprises only whole grain flour.

10. The method of claim 6 wherein the whole grain component further comprises oat, barley, maize, brown rice, faro, spelt, emmer, rye, quinoa, amaranth, triticale, buckwheat and combinations thereof.

11. The method of claim 6 wherein the whole grain component has been aged for at least three months prior to incorporation into the comestible.

\* \* \* \* \*